UNITED STATES PATENT OFFICE.

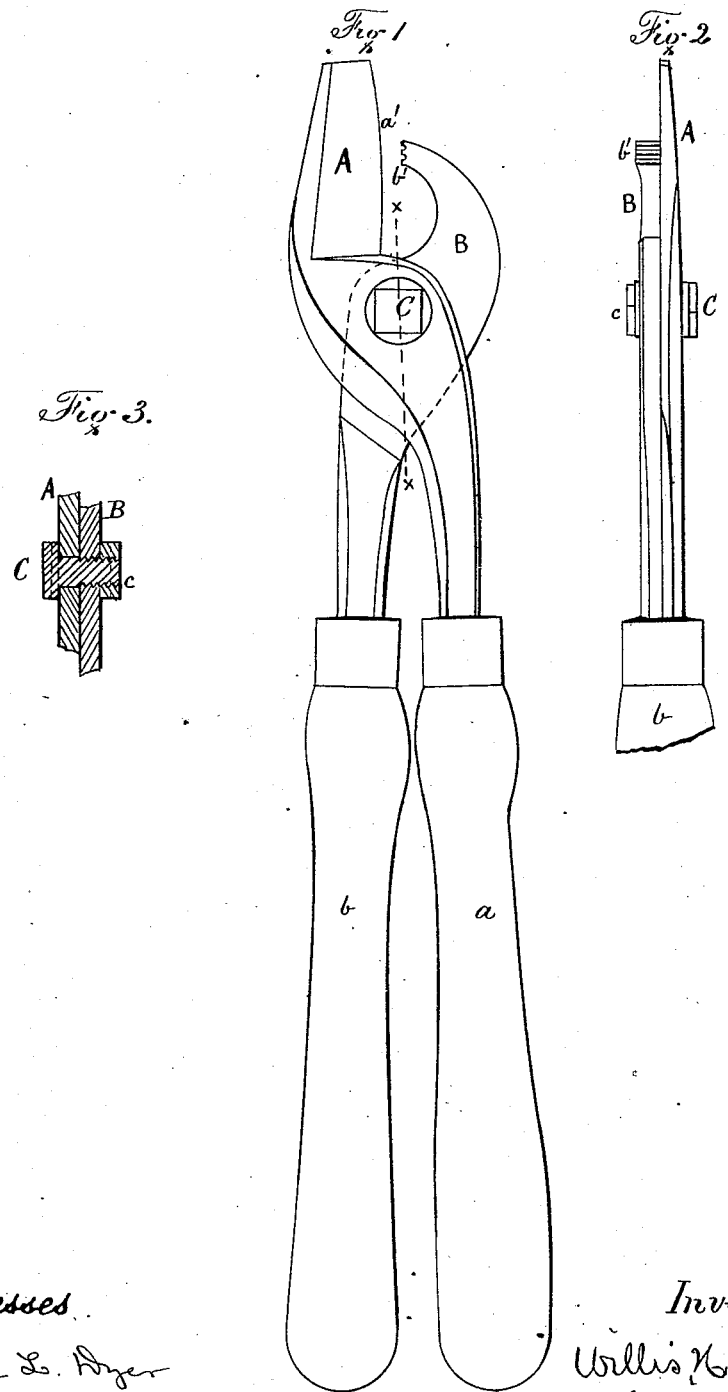

WILLIS H. JOHNSON, OF SPRINGFIELD, ILLINOIS.

IMPROVEMENT IN PRUNING IMPLEMENTS.

Specification forming part of Letters Patent No. 160,103, dated February 23, 1875; application filed July 15, 1874.

CASE B.

*To all whom it may concern:*

Be it known that I, WILLIS H. JOHNSON, of Springfield, in the county of Sangamon and State of Illinois, have invented a new and useful Improvement in Instruments for Felling Small Trees, &c.; and I do hereby declare that the following is a full and exact description of the same, reference being had to the accompanying drawings and to the letters of reference marked thereon.

The object I have in view is the production of an instrument which shall be of great practical use in felling trees of small dimensions, and in lopping or laying down hedges; and my invention therein consists in the combination of a short blade having a sharp convex-shaped curved cutting-edge with a hook-shaped jaw having a blunt roughened end, adapted to seize the tree near the center, while the sharp blade does the cutting.

In order to enable those skilled in the art to make and use my invention, I proceed to describe the same in connection with the drawings, in which—

Figure 1 is an elevation of one side of my instrument, blades open. Fig. 2 is a side elevation of the blades proper. Fig. 3 is a sectional view on the line $x$ $x$ of Fig. 1.

In the drawing, A and B represent the two blades of my instrument, provided with the long straight handles $a$ and $b$ of any shape, preferably round in cross-section. The blades A and B are joined by a pin, C, which passes freely through the blade A, and screws into the blade B. A nut, $c$, screws on the end of the pin C. The blade B and the pin C, therefore, are rigidly connected, while the blade A works loosely upon the pin C. The blade A is of ordinary construction, except its edge $a'$ is sharp and convexly curved. The blade B, however, is hooked, and its point $b'$ is about opposite to the center of the cutting-edge $a'$ of the blade A. The end $b'$ is blunt, and is corrugated, so that any object seized by it may be held without slipping, whereby the bark of the tree at a point near the center thereof is consequently bruised over a very small area, and the tree, after being laid down, will not cease to grow.

In using this instrument for cutting and felling small trees it is desirable that the operator should have an assistant. By means of a hook or fork the top of the tree is drawn or pushed by the assistant toward the direction in which it is to fall, and the instrument is applied at the same time. The force that is applied to the top of the tree prevents the jamming of the cutting-blade, and enables the tree to be easily cut down. When it is desired to lay the tree down in the hedge, so as to make the same grow more dense and impenetrable, the tree is cut off sufficiently, so that it may be pulled down. By the manner in which it is grasped, the cutting is performed more conveniently and more readily, and that portion of the bark which is unsevered is intact and uninjured, so that the sap may have unobstructed flow in such part, and the tree continue to grow thriftily.

Having thus described my invention, and explained its manner of use, what I claim as new, and desire to secure by Letters Patent, is—

The cutting-instrument described, wherein a short, sharp, convex-shaped blade, A, adapted for cutting, is combined with a curved jaw, B, having a blunt roughened end, $b$, terminating at a point nearly opposite the center of the cutting-blade, and adapted to seize the tree near the center thereof, substantially as and for the purposes set forth.

This specification signed and witnessed this 16th day of June, 1874.

WILLIS H. JOHNSON.

Witnesses:
SAML. D. SCHOLES,
T. C. MATHER.